United States Patent [19]

Crowley et al.

[11] 4,325,440
[45] Apr. 20, 1982

[54] METHOD AND SYSTEM FOR COMPUTING SPECIAL FEES IN A PARCEL POSTAGE METERING SYSTEM

[75] Inventors: Raymond R. Crowley, Newtown; Edward P. Daniels, Bridgeport; Earl B. Holtz, Huntington, all of Conn.

[73] Assignee: Pitney Bowes Inc., Stamford, Conn.

[21] Appl. No.: 153,652

[22] Filed: May 27, 1980

[51] Int. Cl.$^3$ ............................................. G01G 23/22
[52] U.S. Cl. ................................. 177/25; 177/DIG. 3
[58] Field of Search ............................ 177/25, DIG. 3

[56] References Cited

U.S. PATENT DOCUMENTS

| | | | |
|---|---|---|---|
| 4,051,913 | 10/1977 | Gudea | 177/25 |
| 4,122,532 | 10/1978 | Dlugos et al. | 177/25 X |
| 4,138,735 | 2/1979 | Allocca et al. | 177/25 X |
| 4,139,892 | 2/1979 | Gudea et al. | 177/25X |
| 4,251,874 | 2/1981 | Check, Jr. | 177/25 X |

*Primary Examiner*—George H. Miller, Jr.

*Attorney, Agent, or Firm*—Mark Levy; Albert W. Scribner; William D. Soltow, Jr.

[57] ABSTRACT

A postage calculator system and method comprising means for introducing postal information to the system; a memory means for obtaining weight information of the article to be mailed; a memory means for storing information indicative of special fee categories; and means for generating a postage value for the article from the postal information, the weight information and the special fee information. The system selects postal information indicative of the carrier type, class and destination of an article to be mailed, obtains weight information for the article, selects special fee information indicative of at least one of the following special fee categories for use with the article: registered mail, special delivery, return receipt, certified mail, insurance and C.O.D. The system then generates a postage value for the article.

15 Claims, 18 Drawing Figures

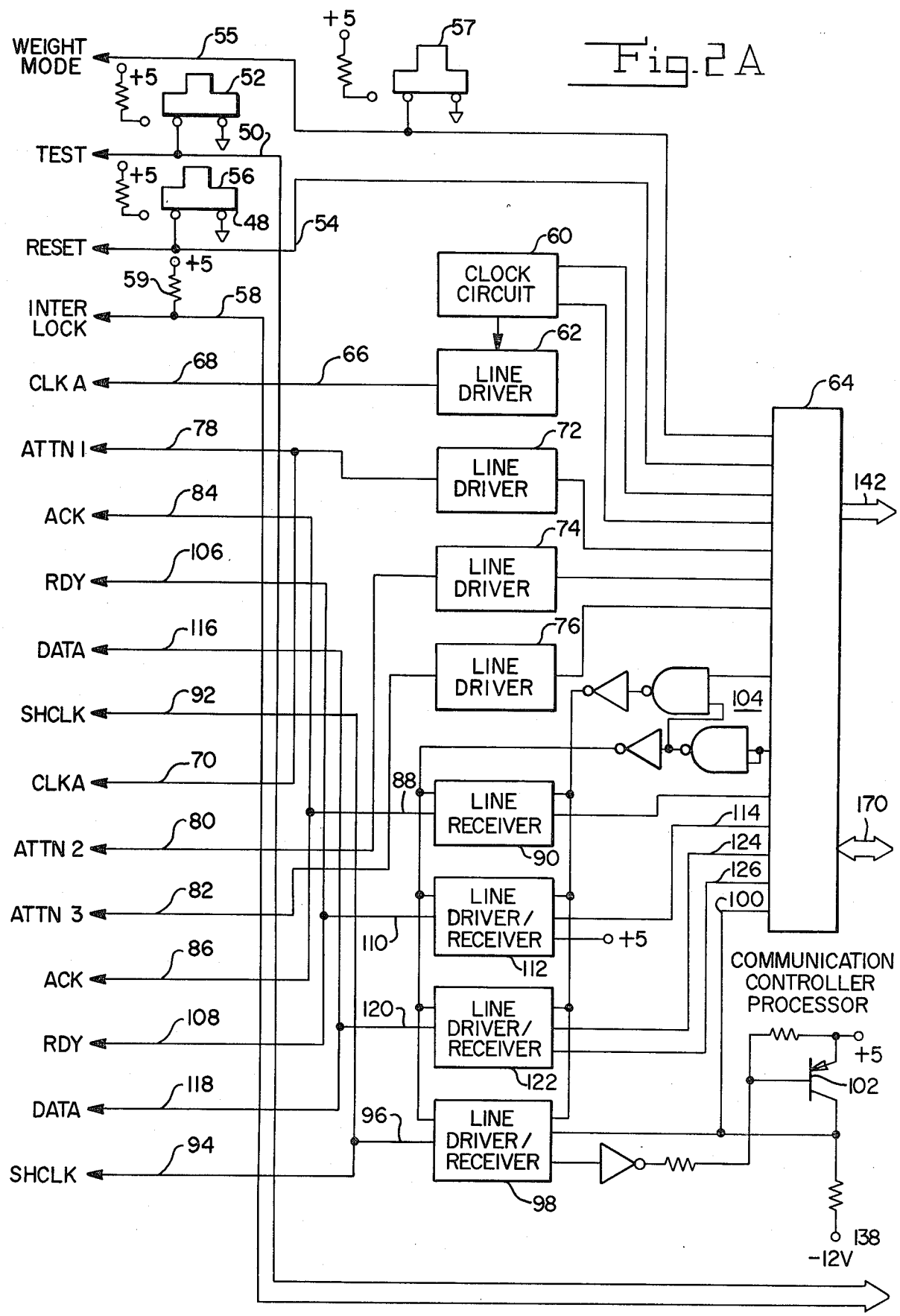

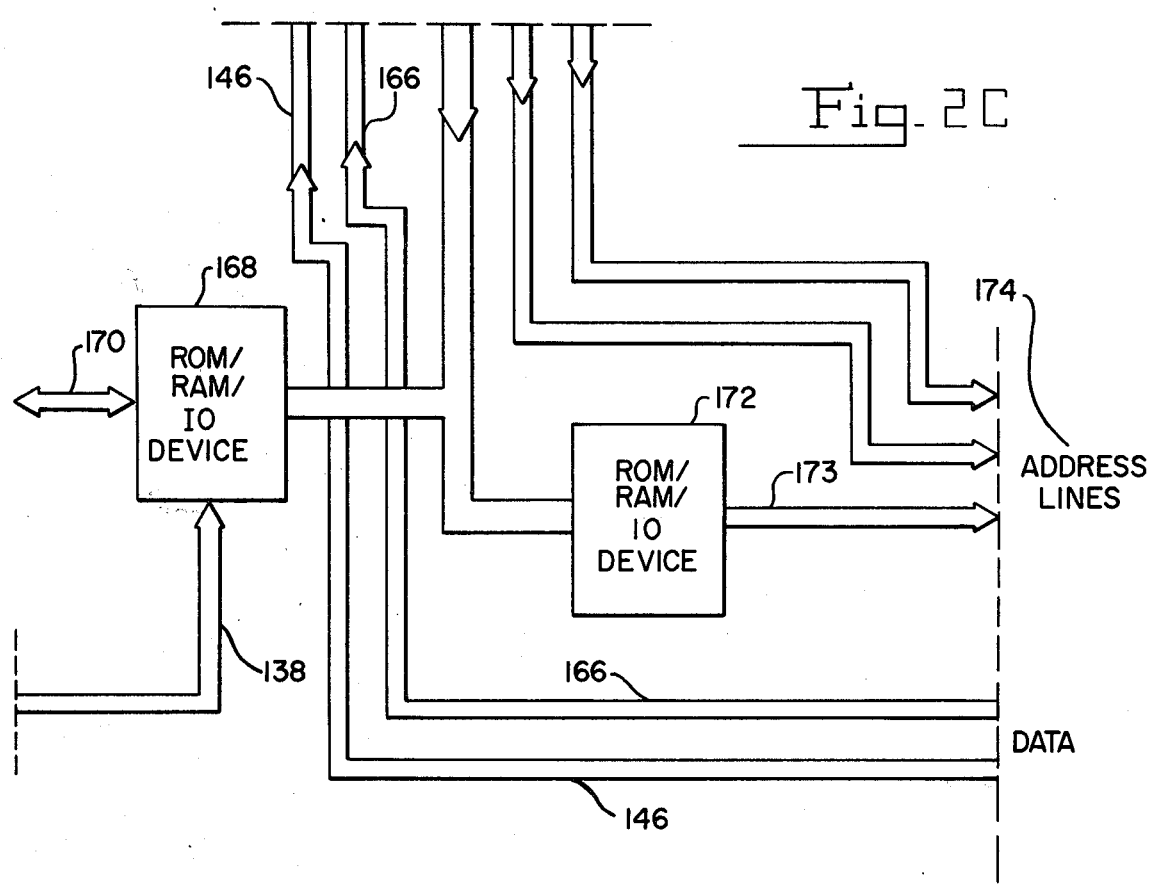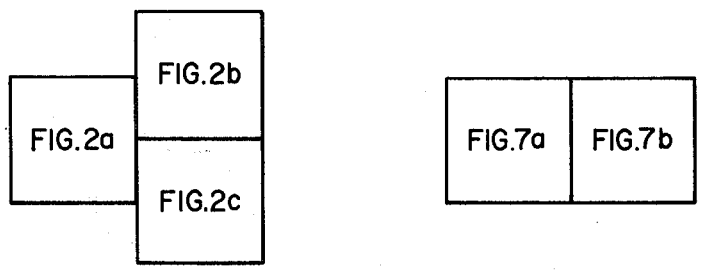

| B7 | B6 | B5 | B4 | B3 | B2← —B0 |
|---|---|---|---|---|---|
| 1 ADD TO TOTAL | S F KEY | WGT | INS | 1 ADD | NUMBER OF |
| 0 REPLACE RATE WITH FEE | | | | 0 SUBTRACT | RESTRICTIONS |

Fig. 12

| B7 | B6 | B5← —B4 | B3 | B2← —B0 |
|---|---|---|---|---|
| 1 WGT | 1 POUNDS | NUMBER OF | 1 DATA > | NUMBER OF |
| 0 VALUE | 0 OUNCES | VALUE BYTES | 0 DATA < | VALUE SETS |

Fig. 14

| B7 | B6 | B5 | B4 | B3 | B2← —B0 |
|---|---|---|---|---|---|
| 1 | 1 | 1 | 1 DOLLARS | 1 BYTES=1+ | NUMBER OF |
| | | | 0 CENTS | 0 BYTES=BYTES | |

Fig. 15

| B7 | B6 | B5 | B4 | B3 | B2← —B0 |
|---|---|---|---|---|---|
| 1 | 1 | 1 DOLLAR HEADER | 1 DOLLARS | 1 BYTES=1+ | NUMBER OF |
| | | 0 WGT/VALUE HEADER | 0 CENTS | 0 BYTES=BYTES | |

Fig. 13

| B7 | B6 | B5 | B4 | B3 | B2 | B1 | B0 |
|---|---|---|---|---|---|---|---|
| 1 | INT'L. SURFACE | INT'L AIR | LIBRARY | BOOK | EXPRESS | 3rd/4th CLASS | 1st CLASS PRIORITY |

Fig. 9

| B7 | B6 ◄——— B3 | B2 | B1 | B0 |
|---|---|---|---|---|
| ∅ | UNUSED | AIR MAIL | INTRA-STATE | INTER-STATE |

Fig. 10

| B7 | B6 | B5 | B4 | B3 | B2 | B1 | B0 |
|---|---|---|---|---|---|---|---|
| RET. REC. | REG. | CERT. | SPEC. DEL. | INS. | SPEC. HAND. | C.O.D. | NO KEY S.F. |

Fig. 11

METHOD AND SYSTEM FOR COMPUTING SPECIAL FEES IN A PARCEL POSTAGE METERING SYSTEM

BACKGROUND OF THE INVENTION

The present invention relates to postage meters and more particularly to a postage meter system and process for calculating special fees to be added to postage for mailing an article. The term, "special fees," as used herein, includes of postal charges for registered mail, special delivery, return receipt, certified mail, insurance and cash on delivery (C.O.D.).

A number of different devices and systems have been developed to help a user determine the proper postage for mailing parcels. The simplest of these devices is, of course, a scale which provides a visual display of the parcel weight. The operator must translate this weight reading to a postage amount by resort to printed rate charts and special fee charts. The user than applies the postage to the parcel either in the form of stamps or in the form of an adhesive-backed tape printed with the user-calculated postage by means of a conventional postage meter.

This simple arrangement may be suitable for a conscientious user who mails few parcels over a given period of time. However, if the user isn't conscientious, he may misread the scale or misread the rate chart or use the wrong rate chart and incorrectly calculate the required amount of postage. If the postage which the user applies is insufficient, the parcel may be returned to its sender, delaying ultimate delivery. If the calculated postage is excessive, the parcel will be delivered but the user will have wasted his money. Moreover, this approach to mailing parcels is time consuming and cannot be effectively used where any significant number of parcels is to be mailed on a regular basis.

To reduce the chances of human error, it would be possible to develop a completely mechanical parcel metering system in which the displacement of a scale platform could be mechanically translated to a particular postage amount for a given class of service, i.e., domestic or international. The calculated postage could then be applied manually either in the form of stamps or a postage meter imprinted tape. The limitations of such a system are clear. The system would have to be kept simple by limiting its use to a particular class of service and by having no provision for determining special fee charges. The mechanical construction required to handle special fees would be incredibly complex, making such a device difficult to build and difficult to maintain. Moreover, a mechanical structure could not be easily updated to reflect the changes in postal rates or regulations.

Attempts have been made to overcome the above-discussed problems through the use of data processing technology and techniques for computation of postage.

For example, U.S. Pat. No. 3,635,297 generally discloses a postage calculator in which exact postage is said to be calculatable as a function of parcel weight, destination zip code and class of handling. The computer is said to include read only memory which stores postal zone information according to the first three digits of a destination zip code and postage rate information according to the combined parcel weight, zone and class of handling.

In U.S. Pat. No. 3,962,988, a postage calculator includes a postage memory which comprises a drum memory having weight increment indicia stored serially on a selected track of the drum. Adjacent tracks are grouped by zones or by specialized rate structures (such as library or book rate) with specific tracks within each group being dedicated to a particular class of service. Postage data for a particular class of service in a particular zone is stored as 16 serial bits of data occurring between successive pound increment indicia. The 16 bits are divided into four serially-occurring, four bit words with the most significant bit of the most significant word occurring first. The 16 bits of data are read out serially, divided into four bit words and decoded to yield a total postage value having up to four decimal digits. Generally speaking, it can be said that the drum memory stores a complete set of postage data for each different weight, destination zone and class of service.

Another postage calculator is disclosed in U.S. Pat. No. 4,047,006. In the system disclosed in this patent, postage data is stored in a plurality of individual storage sections, each of which is dedicated to one or more classes of postal service. Each storage section has a two dimensional array of storage locations. A first dimension address is defined by the destination zone for the parcel while a second dimension address is defined by the total parcel weight. The destination zone and class of service are manually entered to select one of the storage sections and to generate a destination address, which can be considered to be a function of both destination zone and class of service since not all classes of service have different rates for different postage zones. Data representing a required postage value for a package, exclusive of any special fees, is retrieved from the storage location defined by the intersection of the first dimension address and second dimension address.

Another postage calculator is disclosed in U.S. Pat. No. 4,139,892. In the system disclosed in this patent, a postage scale is used in conjunction with random access memories (RAM) and programmable read only memories (PROM) to perform a weighing operation. The postage calculation operation and a data display operation proceed according to various keyboard entries, including special service keys. No provision is made therein for determining whether special fees are mutually exclusive, nor is a method provided therein for subtracting previously added fees when a new, mutually exclusive fee must be calculated.

The prior art systems described above have certain common attributes. In each of the systems, stored data represents total postage values for different parcel weights, different destination zones and different classes of service. Moreover, the systems are generally limited to calculating postage for domestic mail service and provision for calculating special fees, if included, is rudimentary.

Since a significant amount of business involves the use of postal systems using one or more special fees, the prior art systems are not a solution to a sophisticated user's mailing problems. A user of one of the prior art systems must still resort to the use of printed rate charts to determine the proper postage for a package to be mailed with one or more special fees included, or he must begin the entire process of weighing and calculating again if two or more of the desired special fees are mutually exclusive. Moreover, the prior art systems cannot be readily extended to cover parcels mailed using mutually exclusive special fees without greatly increasing the amount of memory required for storage of total postage values. The larger memory needed increases the cost of the calculator.

Additionally, the prior art systems do not generally disclose any mechanism for taking peculiarities of the postal rate structure concerning conflicts, such as prohibiting the use of certain mutually exclusive special fees with each other or with a certain postal class, into account.

SUMMARY OF THE INVENTION

The invention relates to a postage calculator system and a postage calculation method. The word postage is to be interpreted in its broadest sense in this application to include calculatable rates used by many private shipping firms, such as United Parcel Service. The system comprises means for introducing postal information to the system; a memory means for obtaining weight information of the article to be mailed; a memory means for storing information indicative of special fee categories; and means for generating a postage value for the article from the postal information, the weight information and the special fee information.

The system selects postal information indicative of the carrier type, class and destination of an article to be mailed, obtains weight information for the article, selects special fee information indicative of at least one of a plurality of special fee categories for use with the article, and generates a postage value for the article from the postal information, the weight information and the special fee information.

If two special fees are mutually exclusive, this fact is determined. The system subtracts an amount indicative of the first special fee calculation from the total postage value. It then adds an amount indicative of the second special fee calculation.

DESCRIPTION OF THE DRAWINGS

While the specification concludes with claims particularly pointing out and distinctly claiming that which is regarded as the present invention, details of a preferred embodiment of the invention may be more readily ascertained from the following detailed description when read in conjunction with the accompanying drawings wherein:

FIG. 3 illustrates the proper orientation of FIGS. 2a, 2b and 2c;

FIG. 8 illustrates the proper orientation of FIGS. 7a and 7b;

FIG. 9 shows the format of a rate keycode byte used in the USPS system.

FIG. 10 shows the format of a rate keycode byte used in the USPS system.

FIG. 11 shows the format of a rate keyscreen, a special fee keyscreen, special fee restriction header, a special fee complete register or a insurance restriction mask.

FIG. 12 shows the format of a special fee main header.

FIG. 13 shows the format of a special fee sub header.

FIG. 14 shows the format of a special fee chart header.

FIG. 15 shows the format of a special fee dollar header.

DETAILED DESCRIPTION OF THE PREFERRED EMBODIMENT

Figure 1:
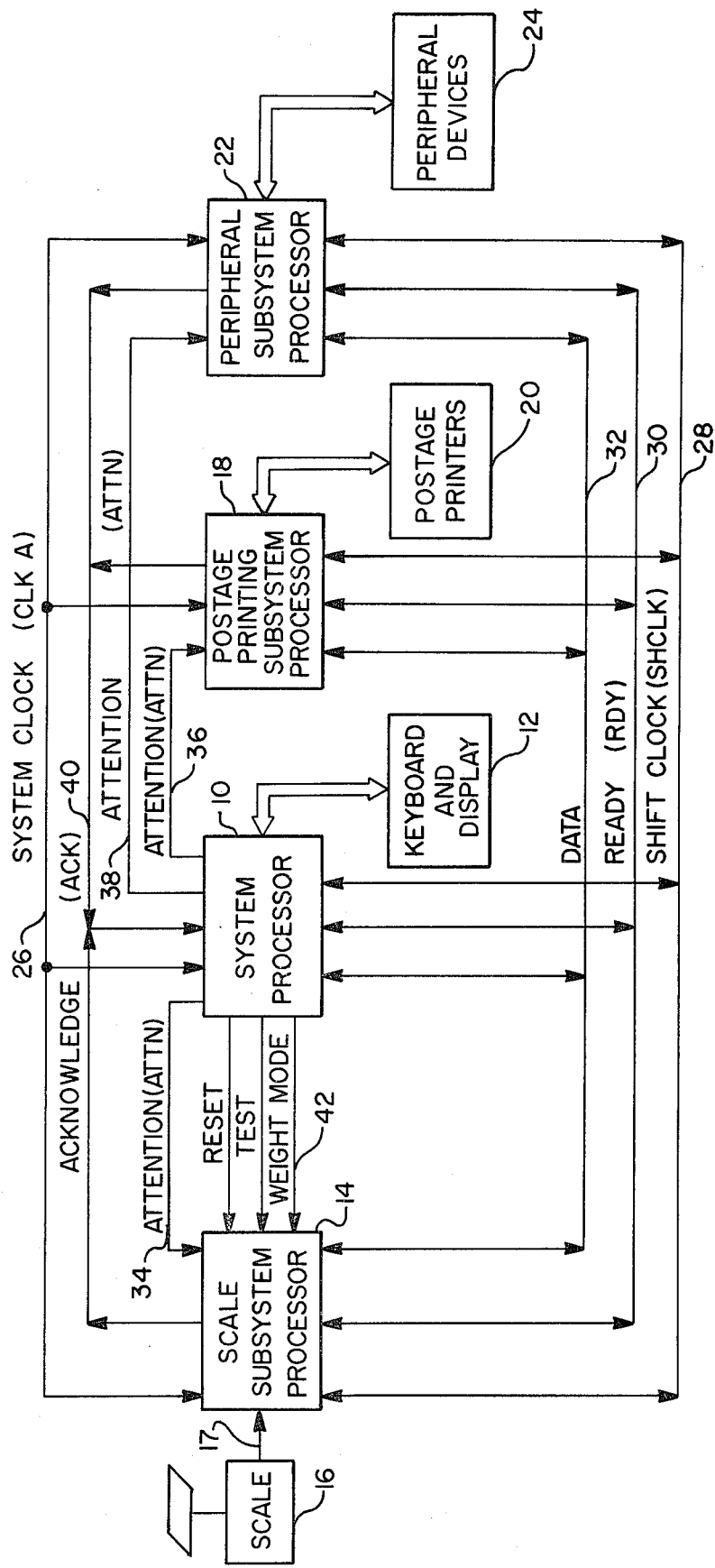
FIG. 1 is a block diagram of the major components of a multi-processor system within which the present invention may be practiced.

Referring to FIG. 1, the central component of the multi-processor parcel postage metering system shown there is a system processor 10 which interfaces with a system user through an input/output subsystem 12 including a keyboard and a visual display. In the preferred embodiment of the invention, the keyboard is used to enter data concerning class of service, destination zone or country of destination, special fees and the like. In one embodiment of the invention, the first three digits of the zip codes for the point of origin and point of destination of a parcel may be entered through the keyboard. A zip-to-zone subroutine programmed into the system processor would convert the entered data to zone information. The display may be a seven-segment digit display indicating the weight of a parcel in metric or English units, its destination zone, a country code for international mailings, special fee charges, and the required postage. In a preferred embodiment, the system would provide visual error codes to inform the user of certain types of system errors.

The system processor 10 is adapted to receive weight-indicating signals from a scale subsystem processor 14 which provides an encoded weight signal representing a parcel weight in pounds, ounces and fraction of ounces or, in the metric system, in kilograms and grams. The scale subsystem processor 14 receives a digital input from a scale 16 over line 17. An analog-to-digital (A/D) device, not shown, may be operatively connected to both the scale 16 and the scale subsystem processor 14 if required.

The system processor 10 is also connected to a postage printing subsystem processor 18 which sets and operates one or more postage printers 20. The connection between the postage printing subsystem processor 18 and the postage printers 20 is shown as bidirectional since the postage printers include sensors which supply signals to the subsystem processor representing the current setting of each printer.

The system processor 10 may also communicate with a peripherals subsystem processor 22 which can control and monitor a number of peripheral devices 24, including, for example, a parcel identification number counter of the type used for United Parcel Service postage transactions, a document printer which would provide a written record of the postage transactions occurring within the system, an electronic accounting system to keep records of postage usage by individual user or cost center, and a floppy disc unit or magnetic tape unit for providing magnetic record storage of the system transactions.

Operations within the multiprocessor system are controlled by system clock signals. (CLK A) generated within the system processor 10 and applied to the processors 14, 18 and 22 over a common clock bus 26.

Other connections from the system processor 10 which are common to the other processors in the overall system include a shift clock (SHCLK) bus 28, a ready (RDY) bus 30 and a serial data bus 32. Each of these busses is bidirectional. That is, signals may be generated either at one of the subsystem processors 14, 18 or 22 and sent via the appropriate bus to the system processor 10 or at the system processor 10 and sent over the same bus to one of the subsystem processors. Generally, the SHCLK signals carried by bus 28 are used in shifting data from a transmitting processor to a receiving processor. The RDY signals on bus 30 provide a signal to the receiving processor that the transmitting processor is enabled to transmit binary data over the serial data bus 32.

A detailed description of the way data is transmitted and verified over the serial data bus 32 as well as a description of the data thus transmitted is included in two copending applications: "Multiprocessor Parcel Postage Metering System Having Serial Data Bus", Ser. No. 13,734, and "Multiprocessor Parcel Postage Metering System Having Data Verification Means", Ser. No. 13,757, filed Feb. 21, 1979. Copending application "System and Method for Computing Domestic and International Postage", Ser. No. 70,234, filed Aug. 27, 1979 relates to an electronic postal scale similar to the one herein described.

Interprocessor communications are controlled by the system processor 10 which, operating under the control of a stored program, addresses any of the other processors with which data is to be exchanged by means of an attention (ATTN) signal. Individual connections from the system processor to the other processors carry these ATTN signals. Unlike the other earlier-discussed buses, each ATTN line runs between the system processor 10 and only one of the subsystem processors in the system. More specifically, ATTN line 34 connects the system processor 10 to the scale subsystem processor 14, ATTN line 36 connects the system processor 10 to the postage printing subsystem processor 18 and ATTN line 38 connects the peripherals subsystem processor 22 to the system processor 10.

Each of the subsystem processors 14, 18 and 22 can respond to an ATTN signal transmitted over its dedicated attention line by returning an acknowledge (ACK) signal to the system processor over a common bus 40. The bus 40 can be shared by the subsystem processor since it can logically be assumed that only the subsystem processor which is being addressed over its dedicated attention line will be replying with an ACK signal.

The system processor 10 and the scale subsystem processor 14 are additionally connected by reset, test and weight mode connections 42 which give the system processor 10 a limited amount of control over the operation of the scale subsystem processor 14.

Figure 2B:
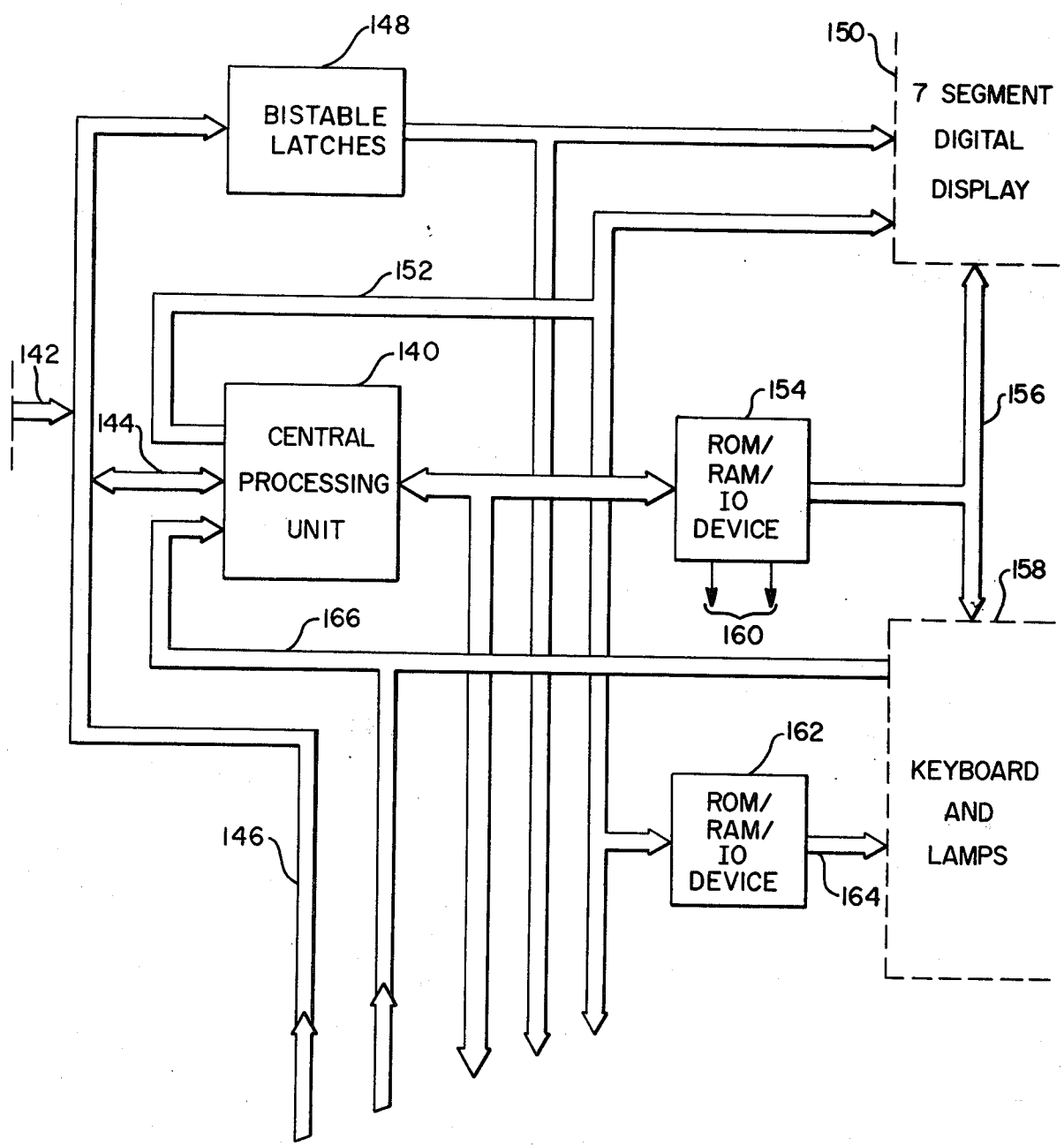
FIG. 2, comprising FIGS. 2a, 2b and 2c taken together, is a more detailed schematic diagram of the system processor in the system of FIG. 1.

FIGS. 2a, 2b and 2c taken together provide a more detailed schematic diagram of the system processor 10. The interprocessor connections described generally with reference to FIG. 1 are shown at the left of FIG. 2a while the system input/output connections and the internal system processor connections are shown generally in FIGS. 2b and 2c.

Beginning at the upper left hand corner of FIG. 2a, the test, reset and weight mode lines 42 (FIG. 1) from the system processor 10 to the scale subsystem processor 14 are shown in more detail. The test line 50 includes a slide switch 52 which can be manually positioned to establish either a +5 volt potential or a ground potential at line 50. Reset line 54 and weight-mode line 55 include similar slide switches 56 and 57, respectively. When the slide switch 52 is moved to the left to establish a +5 volt potential on test line 50, the system processor 10 and the scale subsystem processor 14 enter a test mode in which communication with all other processors is inhibited. In the test mode, the scale subsystem processor 14 will output the five least significant weight data signals in binary coded decimal (BCD) format over the serial data bus. This information will be displayed on the display associated with the system processor 10 for use by a service representative.

The reset signal supplied over line 54 is used to signal the scale subsystem processor 14 to reset or re-zone the scale 16. The weight mode signal is used to determine whether the scale output represents pounds and ounces or kilograms and grams.

An interlock terminal 58 is connected to a 5 volt source through a voltage dropping resistor 59. When the scale 16 is in place, the line 54 is connected to a ground in the subsystem. If the scale 16 is not in place line 54 carries the +5 volt potential of the source. System processor 10 monitors the voltage of line 54 to be sure the scale 16 is in place.

The system includes a clock circuit 60 connected to the interprocessor CLK A bus 68 through a line driver circuit 62. The clock circuit 60 interfaces with a processor 64, dedicated primarily to controlling interprocessor communications. Line driver circuit 62 could be one stage of a tri-state line transceiver circuit such as the DS8833 integrated circuit available from National Semiconductor Corporation. Each stage of this transceiver circuit can be used both as a line driver or as a line receiver in interfacing TTL circuits with MOS circuits. Each stage is also capable of entering a high impedance state in which the circuit appears as an open circuit to the connected systems.

As a matter of convention, a transceiver circuit (such as a line driver 62) used only to drive one of the interprocessor communication buses is referred to only as a line driver circuit. If a transceiver circuit is used only to receive signals, that circuit is described as a line receiver circuit. Where the signal flow is bidirectional, the circuit is identified as a line driver/receiver circuit.

The output 66 from the line driver circuit 62 is applied both to a CLK A bus 68 coupled to the scale subsystem processor 14 and to a CLK A bus 70 shared by the postage printing subsystem processor 18 and the peripherals subsystem processor 22.

The individual ATTN signals are provided by processor 64 through separate line driver circuits 72, 74 and 76. The output of line driver circuit 72 is an ATTN#1 signal supplied over dedicated line 78 to the scale processor 14. The outputs from the line driver circuits 74 and 76 are, respectively, an ATTN#2 signal supplied over line 80 to the postage printing subsystem processor 18 and an ATTN#3 signal supplied over line 82 to the peripherals subsystem processor 22.

As indicated above, a single attention line is dedicated to each different subsystem processor while the ACK lines may be shared by the subsystems. For that reason, an ACK line 84 from the scale subsystem processor 14 and an ACK line 86 shared by the postage printing subsystem processor 18 and the peripherals subsystem processor 22 are combined to provide a single ACK input 88 to a line receiver circuit 90 at processor 64.

Connections for those signals which can originate either at the system processor 10 or at one of the subsystem processors, depending on which of the processors is transmitting, are also shown. Data shifting pulses are provided over SHCLK line 92 to the scale subsystem processor 14 and SHCLK Line 94 shared by the postage printing subsystem processor 18 and peripherals subsystem processor 22. These two lines are connected through a common line 96 to a line driver/receiver circuit 98 having a direct output connection 100 and an input connection to the processor 64 through a high impedance switching circuit 102. When the processor 64 is the transmitting processor, line driver/receiver circuit 98 is conditioned by a control circuit 104 to transmit output SHCLK pulses from processor 64 to the SHCLK terminals 92 and 94. Only the processor previously addressed by a signal on one of the dedicated ATTN lines, however, will be conditioned to accept the SHCLK pulses. The line driver/receiver circuits of non-addressed processors will be in high impedance states and will effectively block SHCLK signals to their processors.

When the processor 64 is the receiving processor, line driver/receiver circuit 98 is conditioned by circuit 104 to accept SCHLK pulses over common connection 96 from either of the SCHLK lines 92 or 94.

The connections between the processor 64 and the other processors in the system include the RDY bus 106 to the scale subsystem processor 14 and RDY bus 108 to the postage printing subsystem processor 18 and peripherals subsystem processor 22. These two RDY buses have a common connection 110 to a line driver/receiver circuit 112 having an input connection 114 to the processor 64. The output connection for the line drive/receiver circuit 112 is a +5 volt source. Whenever circuit 112 is conditioned to operate in its driver mode, this +5 volt potential is supplied over common connection 110 to the RDY buses 106 and 108.

The serial data bus 32 by which all data is transferred from one processor to another in the system is also a shared bus. The data bus 32 includes a first connection 116 to the scale subsystem processor 14 and another connection 118 shared by the postage printing subsystem processor 18 and the peripherals subsystem processor 22. A single lead 120 from 116 and 118 is tied to a line driver/receiver circuit 122 having an input connection 124 and an output connection 126 to and from the processor 64.

While the processor 64 is defined as part of the system processor 10, processor 64 is dedicated primarily to controlling communications with other processors in the complete system.

Processor 64 serves a supporting role relative to a central processor unit 140 (FIG. 2b) to which it is connected through a four line signal path 142 shown both in FIGS. 2a and 2b. As indicated by FIG. 3, the overall system is laid out with FIGS. 2b and 2c being located to the right of FIG. 2a. Connections common to the different figures are represented by cable connections which, if extended, would continue into corresponding cable connections in adjoining figures. For example, if cable 142 were extended from the right side of FIG. 2a, it would continue into cable 142 shown to the left side of FIG. 2b. While the system has been broken down for purposes of illustration by the use of such discontinuous cable, it should be understood that cables bearing the same number in different figures are actually the same continuing cable.

Referring now also to FIG. 2b, the four bit parallel output from processor 64 at cable 142 is supplied to the central processing unit 140 at input/output terminals connected by a cable 144. Postage rate data is similarly applied to the central processing unit 140 through cable 144 from a four bit lead 146 to a postal rate read only memory (ROM), described in more detail hereinbelow.

The central processing unit 140 controls a digital display 150 through a four bit parallel output to a set of bistable latches 148 and another four bit parallel output 152 applied directly to the digital display 150. In a preferred embodiment of the invention, the central processing unit 140 is also connected to a ROM/RAM/IO device 154 which, as the name indicates, contains read only memory storage locations, random access read/write storage locations and input/output ports. Device 154 may, by itself, be conventional in nature. For example, an A17 integrated circuit chip manufactured by Rockwell International Corporation provides each of the functions of device 154.

The primary output from ROM/RAM/IO device 154 is a set of strobe outputs 156 which are used to sequentially strobe or energize both the individual digits in the digital display 150 and columns of key-actuated switches in a system keyboard 158. The device 154 also includes chip select outputs 160 for permitting the central processor unit 140 to address other ROM/RAM/IO units, not shown, via unit 154.

Another of the ROM/RAM/IO devices included within system processor 10 is device 162 which provides read only and read/write storage locations and a multiple bit output 164 which can be decoded to drive indicator lamps in the keyboard and lamp circuit 158. As will be explained in more detail later, the keyboard 158 can provide data from up to 40 keys through four parallel leads 166 to the central processing unit 140 to identify which keys on the keyboard 158 are depressed.

Referring now also to FIG. 2c, the system processor 10 includes a third ROM/RAM/IO device 168 to which cable 138 is connected. The device 168 also communicates directly with the processor 64 through five parallel input/output leads 170. Device 168 communicates with the central processor unit 140 and with a fourth ROM/RAM/IO device 172. Device 172 has a four bit output 173 which, in combination with two other four bit outputs from the central processing unit 140, provide a twelve bit address for accessing read only memory 174 to retrieve postage rate information. The required postage rate data, in one embodiment, is stored on several read only memory chips. For that reason, some of the twelve bits of addressing information 174 are necessarily used to select the chip from which postage data is to be retrieved with the remaining bits being used to select a particular storage location on that chip. Postage data retrieved from the memory 174 is presented in parallel over two four bit cables 146 and 166, also shown in FIG. 2b. All data provided over the eight data lines 146 and 166 is input to the central processing unit 140.

The number of keys in the keyboard of the system may vary, depending upon the complexity of the functions which the system is expected to serve. In a preferred embodiment of the system, up to 40 different key depressions can be detected by arranging the keys of the keyboard in a row and column matrix with each of the rows having a common connection to a keyboard return to the system and each of the columns having a common connection to a strobe output from the system.

Figure 4:
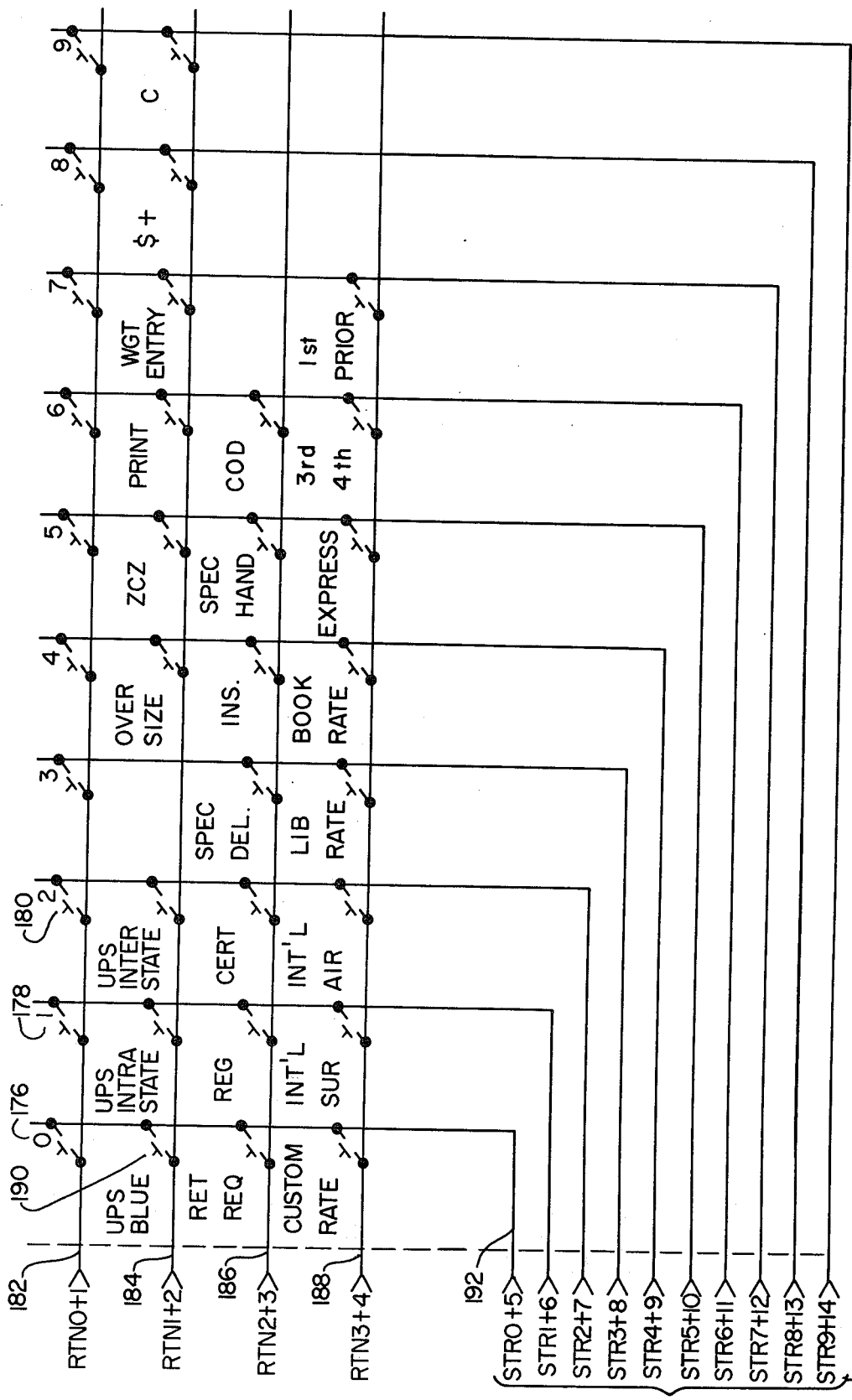
FIG. 4 is a schematic representation of the electrical connections of the keyboard data entry subsystem.

Such an arrangement is illustrated in FIG. 4 wherein three complete columns 176, 178 and 180 of key connections are shown. Each column is connected to one of ten strobe outputs shown generally at 189, from ROM/RAM/IO device 154 (FIG. 2b). The device 154 sequentially raises these strobe outputs 189 to provide a binary one signal which ripples across the array of strobe connections. If a switch at the junction of a particular column and a particular row is closed or depressed when the strobe line is energized, the binary one signal is transmitted on the return back to the system. Conversely, if the switch is open when the column voltage is raised to a binary one level, the return will see only an open circuit. As a specific example, if a switch 190 at the junction of column 176 and row 184 is closed when strobe line 192 is driven to a binary one level, the voltage return 184 will carry a binary one signal. If the remaining switches in column 176 are open at the time, a 0100 signal would be read by the system by raising the voltage on the strobe lines in succession, permitting the keyboard to be checked for depressed keys four at a time.

Figure 5:
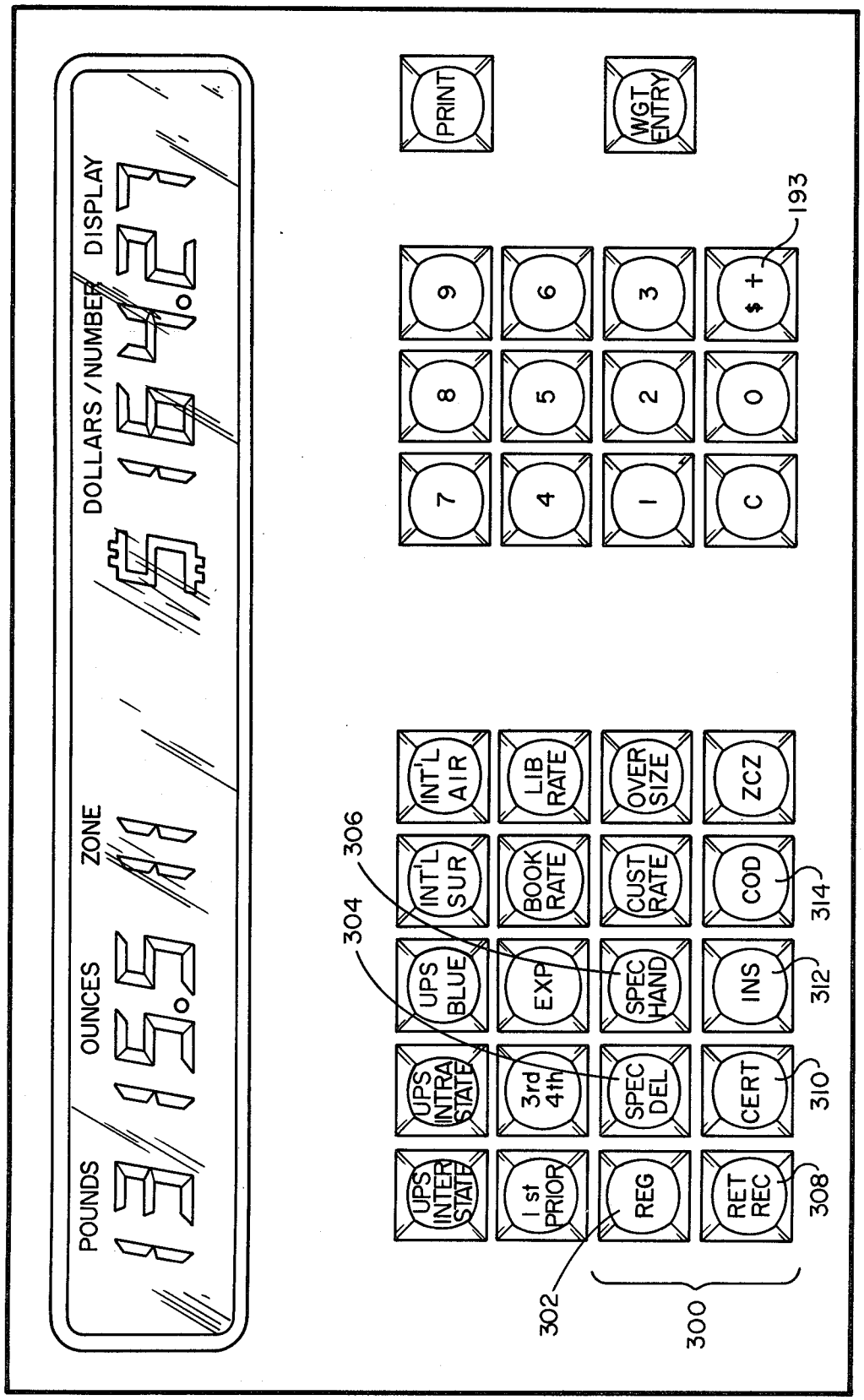
FIG. 5 shows the layout of a keyboard which would be used to enter the necessary data.

It can be seen that the above-described system for detecting whether a specified key has been depressed is extremely flexible. That is, the depression of any key on the keyboard can be detected, regardless of its intended function in system operation. The actual function of each key is pre-programmed in the system so that the location of any one key is not critical to system performance. Since the purpose of each key is a function of the software associated therewith, a user of the system can define the purpose of each key in a unique manner. Functions of certain keys can therefore be changed, duplicated elsewhere on the keyboard, or even abolished if not required in the normal course of business, or if inapplicable in certain locations in the world. Notwithstanding the flexibility of key locations and functions as indicated above, a preferred keyboard layout is shown in FIG. 5. The keyboard includes a visual display capable of displaying a parcel weight in pounds (or kilograms) and ounces (or grams). The visual display includes a zone section and a dollars/number display on which computed postage amounts are displayed. The dollars/number display can also be used to display error codes for mailing errors such as an overweight package or an invalid mode of shipment.

The keyboard includes a 12 key numerical entry section. The type of information entered through this section can include two digit zone entries for domestic mailings, three digit country codes for international mailings, known postage amounts, known special fee amounts, and the like. A $+ key 193 is provided to permit the user to add special fees not otherwise provided for in the calculator.

A 20 key class of service keyboard section permits the user to select from various U.S. Postal Service classes, United Parcel Service classes or international classes of service. Special fee keys shown generally at 300 are provided for permitting additional postage to be computed for special services. The seven special fee keys included on the keyboard in this embodiment of the invention are: REG 302, SPEC DEL 304, SPEC HAND 306, RET REC 308, CERT 310, INS 312 and COD 314.

A brief description of the function of each of these special fee keys is appropriate. The REG key 302 is used with registered mail which requires a fee based upon declared value of the article to be mailed in addition to postage for First Class and Priority mail. Registered mail provides added protection for valuable and important mail as well as evidence of mailing and indemnity in case of loss or damage.

The SPEC DEL key 304 is used to indicate special delivery which requires an additional fee, determined by weight in addition to regular postage for expeditious delivery of mail (First Class, Priority, Third and Fourth Class).

The SPEC HAND key 306 is used to indicate special handling which requires an additional fee, determined by weight, for preferential handling in dispatch and transportation of Third and Fourth Class mail.

The RET REC kay 308 is used for return receipt, which requires a fixed fee, determined by weight in addition to regular postage, for expeditious delivery of mail (First Class, Priority, Third and Fourth Class).

The CERT key 310 indicates certified mail which requires a fixed fee, in addition to regular postage for First Class and Priority mail. A receipt is provided the sender and a record of delivery is sent to the office of the addressee.

The INS key 312 indicates insurance. A fee is based upon declared value of the article to be mailed, in addition to regular postage, to insure Third and Fourth Class mail against loss or damage.

The COD key 314 is used to indicate cash on delivery. USPS, UPS, First, Third and Fourth Class mail may be sent C.O.D.

A ZCZ key calls a zip-to-zone conversion routine. When this routine is called, a user can enter the three digit prefix or the zip code of a domestic destination. The calculator will compute the zone value using the local zip code at the point of origin as a base value.

The keyboard includes two keys relating to international rate structures. One key specifies that a parcel is to travel by international surface mail while the second key indicates that a parcel is to travel by international airmail.

The keyboard further includes a PRINT key by which the user enables a postage meter to print the computed postage directly on a parcel or on a tape once the user is satisfied that the proper information has been entered into the calculator.

As previously indicated, the location of keys on the keyboard which perform the functions described above can be changed and keys can be redefined or eliminated by the user, if desired. The program with which the system is loaded must be suitably modified to accommodate any such key redefinitions.

Normally, the system operates on signals from the scale subsystem processor 14 provided in accordance with a format to be described. However, the keyboard includes a WT ENTRY key which permits a user to manually enter the weight of a parcel if it is known to him.

Figure 6:
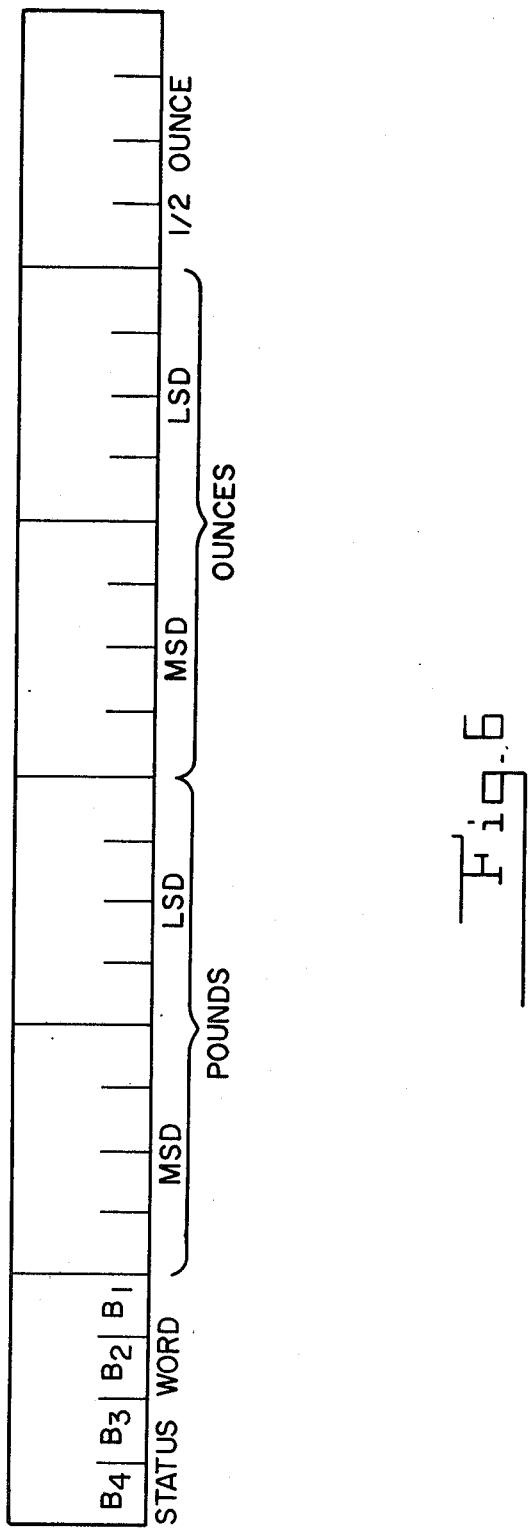
FIG. 6 shows the format of a message transmitted from a scale processor to the system processor.

The format for data transferred from the scale subsystem processor 14 to the system processor 10 is shown in FIG. 6. Scale data is transmitted over the serial data bus 32 in a six word message comprising a status word, two weight information words representing pounds in English units, two weight information words representing ounces, and one weight information word representing a half ounce. Where the weight is expressed in metric units, in addition to the status word, two of the words would represent kilograms while the three remaining words would represent 100 gram, 10 gram and 5 gram weights, respectively. Each word in the message is four bits long. The five weight information words present information in binary coded decimal (BCD) format. In a preferred embodiment, the system is capable of resolving parcel weight to the nearest half ounce or nearest five grams. Therefore, the last information word in the message format is always either 0101 (representing a half ounce or five grams) or 0000 (indicating the parcel weight is rounded to the nearest next larger weight unit).

The status word is a four bit word used to convey information about scale operation from the scale subsystem processor 14 to the system processor 10. In one embodiment of the invention, the most significant bit of the status word, $B_4$, is used to identify the type of scale 16 from which weight information is being transmitted. Depending upon its intended use, the system may be concurrently connected to a scale 16 having a relatively small capacity such as 12 pounds, and to a scale 16 having larger capacity such as 25 pounds or 70 pounds. The system distinguishes between the 12 pound scale 16 and the other two scales since different data processing steps are required.

Bit $B_3$ of the status word is a data validation bit which must possess a predetermined binary value before the system processor 10 will accept the weight information in the message as valid. A data validation bit is necessary in the status word since the scale subsystem processor 14 will supply weight information to the system processor 10 upon command without regard to whether the scale 16 has reached an equilibrium condition. The value of bit $B_3$ indicates to the system processor 10 whether the scale 16 is still moving, and therefore generating invalid weight signals, or whether it has reached a steady state or equilibrium condition from which valid weight readings can be taken.

Bit $B_2$ of the status word is an "overweight" bit which indicates to the system processor 10 whether the parcel weight has exceeded the maximum weight which the scale 16 can normally be expected to measure. This bit inhibits the system from treating an overweight package as if it weighed the maximum possible scale weight.

Bit $B_1$ of the status word is a sign bit which is used in checking scale calibration. A negative scale weight reading, indicated by binary one in this bit position of the status word, indicates that the scale 16 must be recalibrated.

The above-described function of the individual bits in the status word presumes that the scale 16 is operating normally. In addition to the specific functions of the individual bits, the status word considered as a whole four bit word can also be presented by the scale subsystem processor 14 to indicate a malfunction in either the scale element 16 or in the scale subsystem processor 14 connected thereto. For example, setting the status word to 1111 might be used to indicate a weighing element 16 malfunction while a status word of 0111 might be used to indicate a scale subsystem processor 14 malfunction.

Figure 7A:
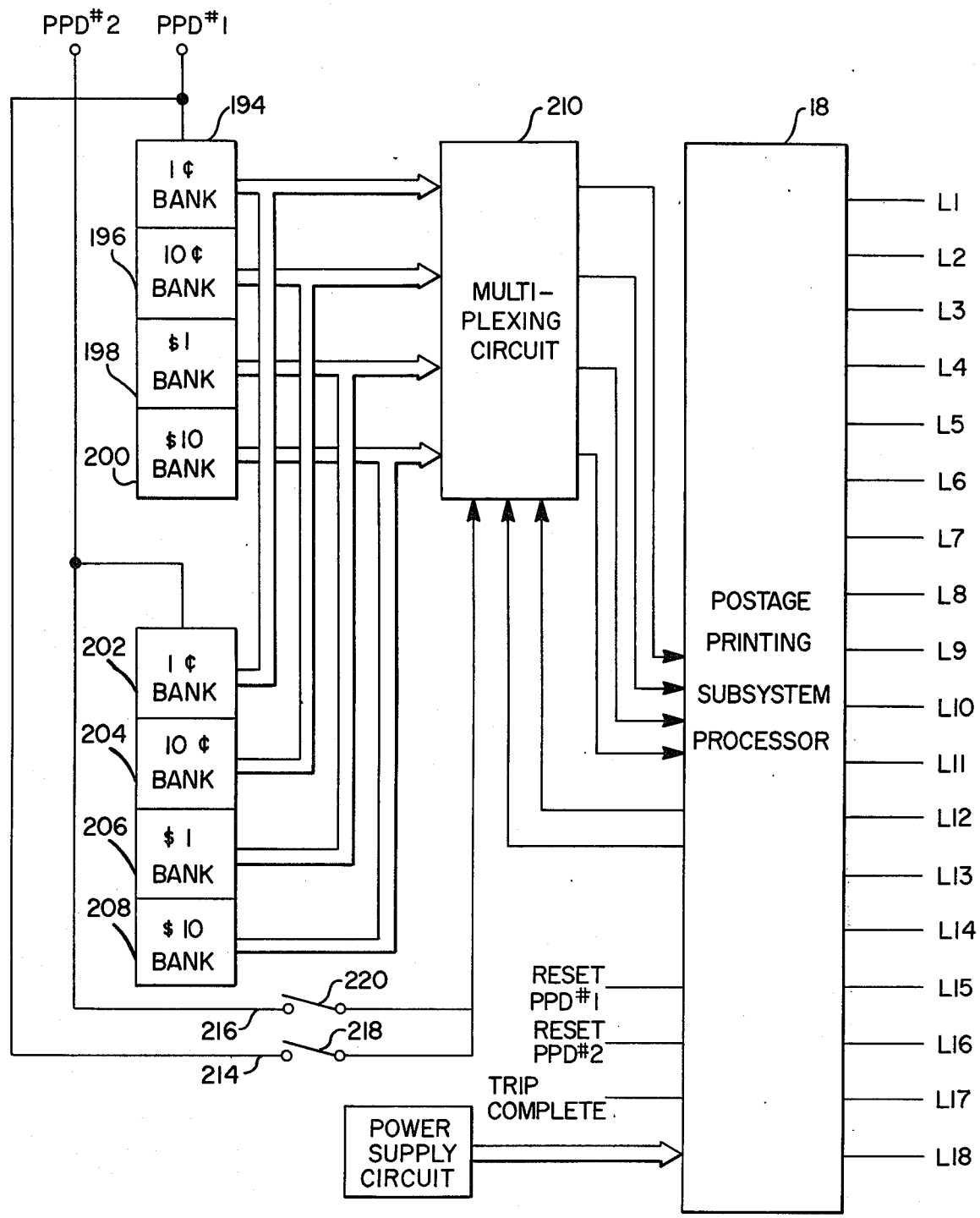
FIG. 7, consisting of FIGS. 7a and 7b taken together, is a more detailed schematic diagram of the postage printing subsystem processor with its input and output circuits.
Figure 7B:
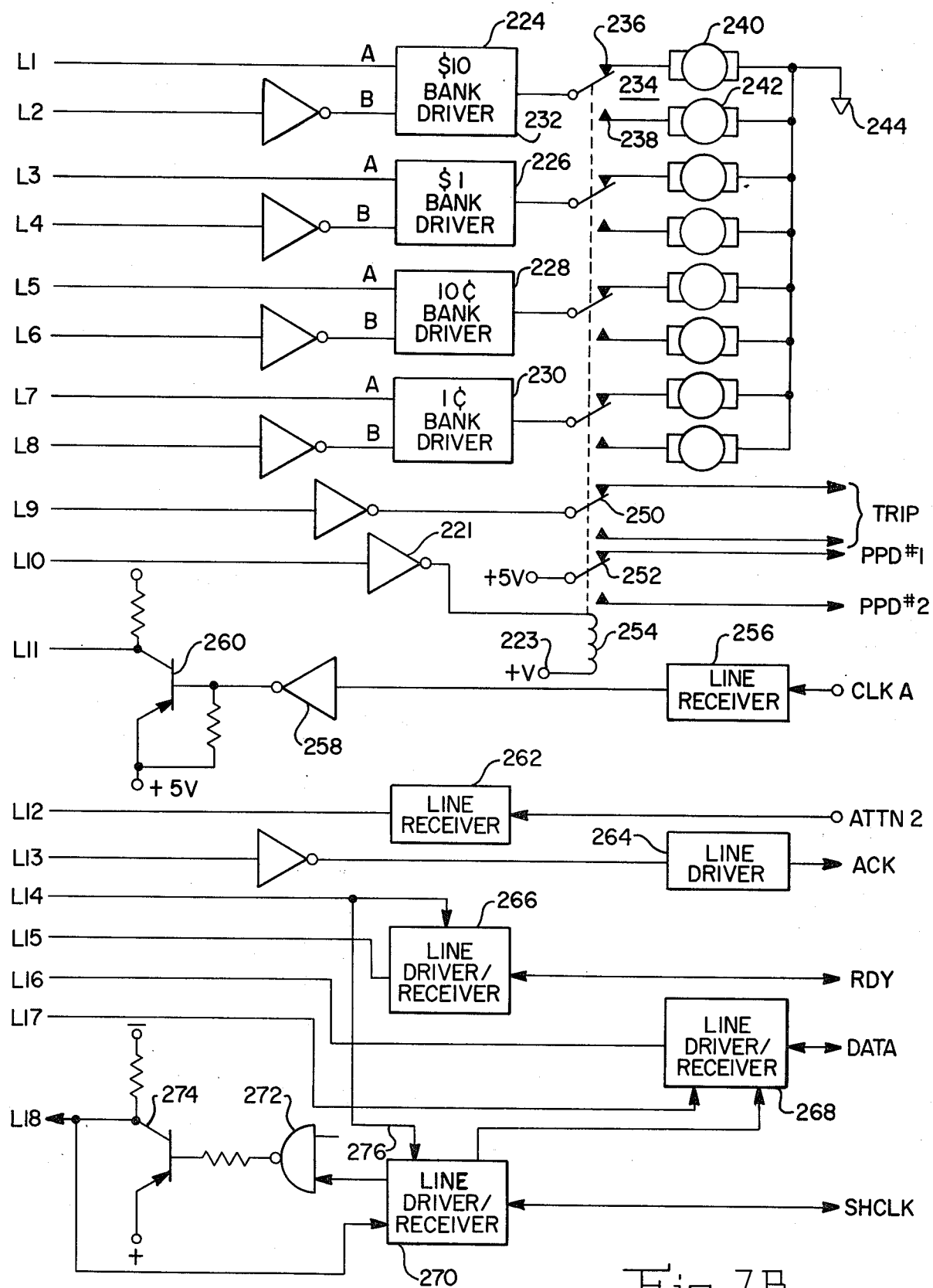

FIGS. 7a and 7b, taken together, provide further details concerning a postage printing subsystem according to a preferred embodiment of the invention. Brief reference should be made to FIG. 8 which establishes the correct orientation of FIGS. 7a and 7b relative to one another.

The postage printing subsystem processor 18 can be used to set either of two postage printing devices identified as printers PPD#1 and PPD#2. Only the electrical components of these postage printing devices are illustrated. Basically, each device is a four digit printer with each digit or bank being independently settable to a numerical value in the 0-9 range. Referring specifically to FIG. 7a, the current setting of each digit of the PPD#1 printer is detected by sensor circuits 194, 196, 198 and 200, each of which provides a multiple bit output which may be decoded to determine the current position of the associated printing element. The current settings of the printing element in the PPD#2 printer are monitored by a separate set of sensor circuits 202, 204, 206 and 208.

The sensor outputs for the corresponding digits in the two printing devices are combined at the input to a multiplexing circuit 210, which is also supplied with signals indicating whether one or both of the printing devices are actually in place. These printer-in-place signals are provided over an input 212 which branches to a lead 214 from the PPD#1 power circuit and to a lead 216 from the PPD#2 power circuit.

A switch 218 is provided on the line of branch 214 between the PPD#1 power circuit and the multiplexing circuit 210. Branch 216 includes a similar switch 220. If the printing device PPD#1 or PPD#2 energized by the corresponding power circuit is in place, the switch 218 or 220 in that branch 214 or 216 is closed by means of a mechanical interlock. When the power circuit is energized, a positive voltage is established on the input 212 through the closed switch 218 or 220. The lack of a positive voltage on input 212 when a printing device has been nominally selected is interpreted as meaning that the printing device is not actually in place.

In a preferred embodiment, each sensor circuit input to the multiplexing circuit 210 is a three bit word. The multiplexing circuit 210 selects each three bit word in sequence, passing those signals to the postage printing subsystem processor 18. The multiplexing circuit 210 cannot, of course, distinguish between the three bit words supplied by corresponding sensor circuits in the two sets of circuits, for example between sensor circuit 194 and sensor circuit 202. The printing subsystem processor 18 must "remember" which printing device is being monitored in order to know which of the two sets of sensor circuits is not energized and can not interfere with the reading of the selected sensors.

Other inputs to the postage printing subsystem processor 18 include a RESET PPD#1 input, a RESET PPD#2 input and a TRIP COMPLETE input. The RESET inputs are operator-initiated inputs which will cause all printing banks of the identified printing device to be reset to zero. The TRIP COMPLETE input is an optical input which indicates to the processor that all mechanical interlocks which might otherwise inhibit a postage printing cycle have been cleared.

Other input/output connections to the postage printing subsystem processor 18 include a set of leads L1-L18. Of these, L1-L10 provide the control signals for setting the printing devices while leads L11-L18 provide the interface to the other processors in the multiprocessor system.

Referring now also to FIG. 7b, lines L1 and L2 are connected to a pair of inputs to a motor driver circuit 224 for the printing elements in the $10 bank of the postage printing devices. A motor driver circuit 226 for the $1 bank is similarly connected to lines L3 and L4 while a motor driver circuit 228 for the 10¢ bank is connected to lines L5 and L6. Finally, motor driver circuit 230 for the 1¢ bank is connected to lines L7 and L8 from the printing subsystem processor 18.

An output from each of the motor driver circuits 224, 226, 228 and 230 is connected to one terminal of a single pole double throw (SPDT) switch which permits the motor driver circuit to be connected to either of two electrical motors. For example, the output of motor driver circuit 224 is connected to a terminal 232 of a SPDT switch 234 having contacts 236 and 238. When terminal 232 is tied electrically to the contact 236, the motor driver circuit 224 controls an electric motor 240 which can be driven in either direction to set the printing element in the $10 bank of the first of the printing devices to desired positions. Conversely, when the terminal 232 is electrically connected to the contact 238, the motor driver circuit 224 controls a second motor 242 which sets the printing element in the $10 bank of the second printing device.

Each of the motor driver circuits decodes the two inputs it receives from the printing subsystem processor 18 to provide control signals which will cause a positive voltage, a negative voltage or no voltage at all to be applied to the SPDT switch at the circuit output. Since the opposite terminal of each motor is connected to ground 244, the polarity of the input voltage or the lack of such a voltage determines whether the motors are being driven and, if so, in what direction. A truth table for the inputs to each of the motor driver circuits is:

| Input | | |
|---|---|---|
| A | B | Motor Output |
| 0 | 0 | Decrease Bank Setting |
| 0 | 1 | Illegal Code-Not Used |
| 1 | 0 | No Change in Bank Setting |
| 1 | 1 | Increase Bank Setting |

A similar SPDT switch 250 connected to output L9 from printing subsystem processor 18 is used to provide a print-enabling TRIP signal to a selected one of the printing devices once the necessary conditions have been found to exist. Another SPDT switch 252 has its input connected to a +5 volt source and its output terminal connected to the PPD#1 and PPD#2 power supply terminals shown at the top left corner of FIG. 7a.

All of the above-described SPDT switches are ganged for synchronous operation under the control of a solenoid 254 having its lower terminal connected to a positive voltage source 223 and its upper terminal connected through an inverter 221 to line L10 from the printing subsystem processor 18. When the solenoid 254 is de-energized by driving the output of inverter 221 to the level of the voltage from source 223, the blade of each of the switches remains in its upper position. In these positions, drive motors for printing device PPD#1 are connected to the motor driver circuits 224, 226 and 228 and 230 while the +5 volt source is connected through switch 252 to provide power for the sensor circuits 194, 196, 198 and 200 for the same device PPD#1. Conversely, when the solenoid 254 is energized, the SPDT switches are set to their lower positions wherein the setting motors for printing device PPD#2 are connected to switch 252.

The postage printing subsystem processor 18 interfaces with the other processors in the system through lines L11-L18. The system clock (CLK A signals) is applied to line receiver circuit 256 which drives an inverter amplifier 258 at the input to a high impedance switching circuit 260. The output from the switching circuit 260 is connected to terminal L11 to provide clock pulses for synchronizing operations within the printing subsystem processor 18 with operations elsewhere in the system.

The attention signal ATTN2 dedicated to the printing subsystem processor 18 is applied to terminal L12 through a line receiver circuit 262 while the acknowledgement signal ACK provided by the processor 18 in response to the ATTN2 signal is output from terminal L13 through a line driver circuit 264.

RDY signals originating elsewhere in the system are applied to terminal L15 of the printing subsystem processor 18 through a line driver/receiver circuit 266 while RDY signals originating within the processor 18 are output from terminal L14 thereof to the circuit 266.

The serial data bus, over which the printing subsystem processor 18 exchanges status information and data with the remainder of the system, includes a line driver/receiver circuit 268 through which incoming data can be applied to terminal L16 of the processor 18. Data originating within the processor 18 is output from terminal L17 to the line driver/receiver circuit 268.

SHCLK pulses used in transmitting data to and from the printing subsystem processor 18 one bit at a time are applied through line driver/receiver circuit 270. Incoming SHCLK pulses are applied through circuit 270 and serially-connected inverter gate 272 to a high impedance switching circuit 274, the output of which is connected to terminal L18 of the processor 18. Outgoing SHCLK pulses are generated only when such pulses appear on terminal L18 while a connection 276 from terminal L14 to the line drive/receiver circuit 270 indicates that the outgoing RDY line is also high. When both conditions are satisfied, line driver/receiver circuit 270 passes data shifting pulses to line driver/receiver circuit 268 in the DATA bus circuit to permit data to be transmitted from the processor 18 over the serial bus.

Software and stored data, used in combination with the above-described hardware to compute special fee charges and total postage, is described with reference to the remaining figures of this application.

The type of memory employed for a preferred embodiment of the invention employs eight bit words, referred to generally as storage bytes. As will be noted later, these eight bit words may be encoded in various formats. The most common format is one which divides each word into two four bit bytes, each of which is encoded in hexadecimal (base 16) format. The words may also be encoded in binary format, either as an eight bit unsigned word or as a seven bit word, the sign of which is indicated by the binary value of the most significant bit in the byte. Certain FLAG words are actually microinstruction words within which specific bits are interpreted as having specific meanings depending on their binary value. These FLAG words are used to define the remainder of a chart in which they appear or to control postage computation or printing steps.

Unless stated otherwise, it can be assumed that any table entry is in the form of two four bit words encoded in hexadecimal format.

As previously indicated, the special fee mask or rate screen 320 consists of two rate screens: a rate keycode byte and a rate keyscreen byte. FIG. 9 represents the format of a rate keycode byte used in the USPS system to indicate which special fees are allowable with a specific key. Bit $B_7$ is always set to binary one in this byte. A binary one in bit $B_6$ indicates that the parcel is to be mailed by surface transportation internationally; a binary one in bit $B_5$ indicates that the method of shipment is to be by air internationally. A binary one in bit $B_4$ indicates library rate; in bit $B_3$ indicates book rate; in bit $B_2$ indicates express rate; in bit $B_1$ indicates third or fourth class; and in bit $B_0$ indicates first class or priority rate.

Similarly, the format of the rate keycode byte used in the United Parcel Service (UPS) system is shown in FIG. 10. Bit $B_7$ is always set to binary zero in this byte. Bits $B_3-B_6$ are always unused. A binary one in bit $B_2$ indicates that the parcel is to be mailed by air. A binary one in bit $B_1$ indicates the intrastate rate and in bit $B_0$ indicates the interstate rate.

The keyscreen byte is used to indicate which rate key has been pressed. This keyscreen byte can be either one of two: a rate keyscreen or a special fee keyscreen, the format of which is shown in FIG. 11. Referring now to the format of the rate keyscreen byte (FIG. 11), a binary one in bit $B_7$ indicates that the RET REC (return receipt) key on the keyboard was pressed; in bit $B_6$ indicates the REG (registered) key; in bit $B_5$ indicates the CERT (certified) key; in bit $B_4$ indicates the SPEC DEL (special delivery) key; in bit $B_3$ indicates the INS (insurance) key; in bit $B_2$ indicated the SPEC HAND (special handling) key; and in bit $B_1$ indicates the COD (cash on delivery) key was pressed. Bit $B_0$ is the NO KEY SPECIAL FEE bit, described in greater detail hereinbelow.

When calculating special fees, restrictions based on postal service regulations must be considered. That is, certain special fees may not be used with certain postal classes, e.g., a parcel cannot be mailed C.O.D. third class. In addition to the postal service restrictions, another type of restriction often occurs with special fee calculations. That is, often calculation based on the depression of one special fee key requires that another key or keys be pressed immediately prior thereto.

For dealing with such key code restrictions, other headers are required. The format of the special fee main header is shown in FIG. 12. This special fee main header indicates which restrictions are to follow. A binary one in bit $B_7$ indicates that a fee is to be added to or subtracted from to the rate previously calculated and that the total result becomes the output fee. A binary zero in this $B_7$ position indicates that the rate is replaced by the fee. A binary one in bit $B_6$ indicates that special fee key restrictions are present. A binary one in bit $B_5$ indicates that a weight restriction exists; in bit $B_4$ indicates that an insurance restriction exists. The setting of bit $B_3$ indicates whether the calculated fee is to be added to ($B_2=1$), or subtracted from ($B_2=0$), the total. Bits $B_0-B_2$ are used to indicate the number of restriction sets that are applicable and therefore that must be considered.

The rate keycode and the keyscreen bytes are used in conjunction with other chart headers. Three types of special fee charts are used by the system: weight oriented charts, value oriented charts and fixed fee charts. Weight oriented charts include information for calculating fees based on the weight of the parcel to be mailed. Value oriented charts include information for calculating fees based on the declared value of the contents of the parcel to be mailed. Finally, fixed fee (or dollar) charts include information for calculating fees, which information is independent of the weight or the value of the parcel to be mailed.

The special fee sub header, shown in FIG. 13, reflects the status of weight, value and dollar charts. System control can be incremented through the rate chart when more than seven values follow the present location in the rate chart. Bits $B_7$ and $B_6$ are always set to binary one in this header. A binary one in bit $B_5$ indicates that this header is to be used as a dollar header; a binary zero indicates that this header is to be used as either a weight or value header. A binary one in bit $B_4$ indicates dollars; binary zero indicates cents. A binary one in bit $B_3$ indicates that the number of bytes to be considered is one more than before the operation was performed; binary zero indicates that the number of bytes has not changed. Bits $B_0-B_2$ are used to indicate the number of bytes that are applicable and therefore that must be considered.

The special fee chart header, shown in FIG. 14, indicates whether a dollar value or a weight has been entered and directs the system to consider the appropriate chart. A binary one in bit $B_7$ indicates that the header is used for weight restriction; a binary zero indicates that the header is used for value restriction. A binary one in bit $B_6$ indicates pounds, kilograms or dollars; a binary zero indicates ounces, grams or cents. Bits $B_4$ and $B_5$ are used to indicate the number of value bytes to be considered. A binary one in bit $B_3$ indicates that the value of incoming data must be less than or equal to the value in memory; a binary zero indicates that the value of incoming data must be greater than the value in memory. Bits $B_0-B_2$ are used to indicate the number of value sets that are applicable and therefore that must be considered.

The special fee dollar header, shown in FIG. 15, indicates that dollars and/or cents must be read. Bits $B_5-B_7$ binary one in this byte. A binary one in bit $B_4$ indicates dollars; a binary zero indicates cents. A binary one in bit $B_3$ indicates that the number of bytes to be considered is one more than before the operation was performed; binary zero indicates that the number of bytes has not changed. Bits $B_0-B_2$ are used to indicate the number of bytes that are applicable and therefore that must be considered.

Reference should now be made to the following program outline used to describe the operation of the special fee subprogram.

---

SPECIAL FEE CALCULATING PROGRAM OUTLINE

Perform Decode Fee
Perform Read and Store Main Header
If Subtract Fee
  Set Subtract Flag
  Continue -
Else Continue
Perform Read and Store Keycode Restriction
If Fee is Not Valid With Postal Class
  End Module
Else If Special Fee Restriction Present
  Perform Read and Store Restriction
If Fee Does Not Pass Restriction
  Set Soft Error Flag
  Else Set Restrictions Met Flag
  Continue
Else If Weight Restriction
  Perform Read and Store Weight Restriction
If Fee Does Not Pass Weight Restriction
  Set Soft Error
Else: Continue
Else: If Insurance Restriction
  Perform Read and Store Restriction
If Fee Does Not Pass Insurance Restriction
If Other Restrictions Were Met
  Reset Soft Error
  Go to 100
Else: Set Soft Error
100: Else: Else: If Soft Error

SPECIAL FEE CALCULATING PROGRAM OUTLINE
-continued

```
If Last Restriction
  Perform Clean Up
  End Module
Else: Perform Check in Restriction Set
Else: Perform Read Keyscreen
If Fee Incompatible With Existing Fees
  Reset All Bad Fees
  Set Redo Flag
  Continue
Else Perform Read Chart Header
If Value Needed
If No Value Entered
  Ask for Dollar Value
  End Module
Else: Else Do While Headers Available
If Correct Range
If Add Fee
  Add Fee to Dollar Total
  End Module
Else If Subtract Fee
  Subtract Fee From Dollar Total
Else: Replace Total With Fee
Else: Point at Next Range
  Continue Do While
End Do While: If Value Fee
  Ask for Dollar Value
  End Module
Else End Module
```

In analyzing the above program outline, hereinafter the term "return" is used to signify that the system monitor resumes control.

In operation, the special fee subprogram runs in the following manner after a user enters a special fee from the keyboard. When a rate key is depressed, rate screens, FIG. 11, are stored in RAM locations. The rate keyscreen, FIG. 11, indicates which special fees are allowable with the specified rate. The second rate screen stored in RAM is a keycode screen, shown in FIG. 9 (USPS key codes) and FIG. 10 (UPS key codes). This rate keycode screen indicates which rate is in effect.

When a special fee key is pressed, the system returns a bit pattern which signifies one of the special fees. The special fee program is then entered. The bit pattern that is returned is then used to vector to the selected special fee address in the ROM.

At this point in program execution, the special fee main header, shown in FIG. 12, is considered. Bit $B_7$ of the main header is checked to determine whether a fee should be added to or subtracted from the total dollar value and whether the rate should be cleared and replaced with the fee.

The special fee main header, FIG. 12, bit $B_3$ indicates whether the fee should be added to or subtracted from the dollar total value. If the fee is to be subracted, the subtract flag is set. Otherwise, the flag is reset.

In this main header are also restriction bits. These bits are a special fee key restriction (bit $B_6$), a weight restriction (bit $B_5$) and an insurance restriction (bit $B_4$). Any one of these bits or any combinaton thereof can exist in the main header.

After the main header is analyzed, the special fee program then determines whether the depressed key is valid with the selected rate. This is done by comparing the bit pattern produced by the strobe and return of the fee with the rate keyscreen of special fees (FIG. 11). If this first test is passed, additional special fee restrictions are considered.

The first restriction that is checked is the special fee key restriction. This restriction is used to determine whether a prior special fee should have been pressed in order for this fee to be valid. If this restriction is passed, the weight restriction is then considered. A weight restriction is the maximum weight for a certain fee. If the maximum weight is exceeded, this restriction is not passed, and the system returns. If this weight restriction is passed, howeer, the system then determines whether an insurance restriction exists.

If an insurance restriction exists, the dollar value that was entered for the insurance key is compared to the dollar value required for insurance for this special fee. Note however that this insurance restriction first requires that an insurance key be depressed. Once the system passes the insurance restriction, fee calculation continues.

After the above restrictions are met the system then determines whether the current fee is compatible with previously selected fees. If it is not, all incompatible fees are cancelled and all remaining fees are recalculated.

After all the restriction sets are met, the system determines whether the fee is value oriented or weight oriented by referring to the special fee chart header, FIG. 14. If the fee is a value oriented fee, the system determines whether a value was entered for the fee. If a value was not entered for the fee, the system requests a dollar value from the user by displaying a $--- sign on the display while the system returns. If a dollar value is entered at this point, fee calculation continues. The dollar value or the weight for this fee then determines which chart should be considered next.

The special fee dollar header, FIG. 15, is then used to calculate the dollar value which is to be added to the fee. The dollar header can also have a subdollar header associated with it. If the initial seven values of the subheader signifies cents only, only one byte is required to indicate each cent. If the next seven values are in dollars and cents, then two bytes will be required to indicate this amount. In FIG. 20, bit $B_3$ indicates that more than one byte is required to represent the dollars and cents amount.

FIG. 13 shows a subheader. This subheader can be used to indicate dollars, weight, or value, depending on the setting of its bit $B_5$.

The subheader, FIG. 13, can change the number of bytes required to indicate the dollar value, thus adding two digits to the dollar value for each additional byte. This is the function of bit $B_3$ in FIG. 13.

After the correct dollar value is found for the fee, it is added to or subtracted from the base rate, as indicated by bit $B_3$ (FIG. 12). The correct dollar value can also replace the base rate, as determined by the setting of bit $B_7$ of the special fee main header (FIG. 12).

As previously mentioned, the system determines whether the fee has passed the special fee key restriction. That is, have the appropriate special fee keys been pressed on the keyboard prior to the determination of the present special fee calculation? This determination is made by consulting the special fee restriction header, FIG. 11. If a bit is set in this special fee restriction header, it indicates that the special fee being calculated requires that one of the special fee categories had to have been set previously.

The system then determines whether a fee from a previous special fee key had been calculated by consulting the Special Fee Complete registers in RAM. The Special Fee Complete registers are identical to the special fee keyscreen header, FIG. 11. The system builds the Special Fee Complete registers as new special fees are calculated. Consequently, the Specal Fee Complete registers are constantly updated.

During the processing, the system determines whether the special fee under consideration has passed the restrictions which were relevant as determined by the special fee main header in conjunction with the special fee keyscreen header. If the special fee being calculated does not pass restrictions, a soft error flag is set. The reason a soft error, rather than a hard error, flag is set is that there may be numerous restriction sets and if the first restriction (e.g., special fee key restriction) is not passed, subsequent restrictions may be passed; in such a case, the soft error is subsequently voided. If the special fee being calculated does pass the restrictions, the soft error flag is cleared.

When the system consults the special fee main header, FIG. 12, it determines whether a we'ght restriction is present by determining whether bit $B_5$ is set. If such a weight restriction is present, the weight restriction is read from ROM and stored in RAM.

The system then reads the weight and compares it to the value stored in the ROM. For these purposes the special fee weight restriction chart header, identical to the special fee charge header shown in FIG. 14, is consulted. This header indicates whether the weight entered should be greater than or less than the value read in from the ROM. Also in this header is information concerning the weight itself: ounces or pounds and ounces. If the fee does not pass the weight restriction as indicated above, a soft error flag is set. If the fee does pass the weight restriction, the system performs the check insurance restriction module.

The system reads the insurance data consisting of the insurance restriction and insurance mask. This insurance mask is identical to the special fee keyscreen shown in FIG. 11, with bit $B_3$ set only. This insurance data is stored in RAM. If the special fee does not pass the insurance restriction as determined by consulting these headers, but does pass either the special fee key restrictoon or the weight restriction, then the soft error glag is cleared and restriction checking is terminated. If, however, the special fee does not pass the insurance restriction and neither of the other restrictions (special fee restriction or weight restriction) was passed, the soft error flag is set. If the fee does not pass the insurance restriction but other restrictions were met and the soft error flag was cleared, the system then resumes processing at the module entitled Check Soft Error Flag.

The system determines whether the soft error flag has been set in any of the previous modules (e.g., the special fee restriction, the weight restriction, or the insurance restriction module). If the soft error flag is set, the system then determines whether all restrictions have been handled. If no restrictions remain to be handled, the system resets all flags that have been set in previous modules and the system returns control to the monitor. If the soft error flag has been set and there are still restrictions that remain to be tested, the system then returns to the checked special fee restriction module and continues to handle the restrictions in the order hereinabove described. This process continues until either the restrictions are exhausted or the soft error flag is cleared.

If, however, no soft error flag was set, the system continues processing.

If no restrictions of any sort are present, the system reads the keyscreen as shown in the special fee keyscreen header, FIG. 11. The system determines whether the present fee is incompatible with existing fees completed, as indicated by the Special Fees Complete register as described above. If the fee is incompatible, all bad fees are reset in the Special Fee Complete register and a redo flag is set. The redo flag indicates that the fee that is being calculated is incompatible with previous fees completed and that all such previously incompatible fees must be cleared. All originally compatible fees are recalculated.

If there are no incompatible fees or if the redo flag has been set, the system reads the special fee chart header, FIG. 14. The system then determines whether a dollar value is needed for the fee in question (as indicated by a zero in bit $B_7$) and whether a dollar value has been entered, if required. If the system determines that a value has not been entered, it prompts the operator for a dollar value. The display shows the following characters: $---. The system then returns control to the monitor.

If a value is not needed for the fee or if a value was needed and previously entered, the system determines the correct range for the dollar value entered. This is performed by indexing through chart headers such as that shown in FIG. 14 and through subchart header such as that shown in FIG. 13 until a successful comparison is made between value entered for the weight entered and the values taken from rate ROM. The special fee subchart header (FIG. 13) is used when there are more than seven value sets indicated by bits $B_0$–$B_2$ of the special fee chart header, FIG. 14; or bits $B_0$–$B_2$ of previous special fee subchart headers (FIG. 13). The special fee subchart header can also be accessed when the number of value bits shown in bits $B_4$–$B_5$ of the special fee chart header increases or decreases from the values shown in the previous chart header. This can occur, for example, when the value required goes from ounces to pounds and ounces.

If the correct range has been determined, the system indexes through the dollar headers, FIG. 15, and increments to the correct dollar value. If the fee is to be added, as indicated by bit $B_3$ of the special fee main header, FIG. 12, the system adds this special fee to the base rate and returns control to the monitor. If the fee is to be subtracted, however, the system subtracts the special fee from the base rate and returns control to the monitor.

Finally, if the fee is to replace the base rate, as indicated in the special fee main header as bit $B_7$, FIG. 12, the system replaces the base rate with the special fee and the control returns to the monitor. If the value is not found within the first header's range and subheaders are still available, the subheader is read and stored and processing continues. Subsequent headers are thereby checked for the correct range. The subheaders hereinabove described are shown in FIG. 13 as special fee subchart headers.

If there are no more subheaders available and the system determines that the fee requires a dollar value, the system prompts the operator for a dollar value. The display shows the following characters: $---. At this point, control returns to the monitor. If the fee is not value oriented, the system merely returns control to the monitor.

The system has been described thus far without reference to specific processors or specific programming languages since different commercially-available processors and different programming languages compatible with the particular processors might be used.

In a preferred embodiment, the system central processing unit 140 (FIG. 2b) may be a PPS-4/1 one chip microcomputer, MM-76 series. The communications controller/processor 64 (FIG. 2a) is an A-79 processor chip. The scale subsystem processor 14 (FIG. 1) and the peripheral subsystem processor 22 (FIG. 1) are preferably MM-78 series microcomputers, while the postage printer subsystem processor 18 (FIG. 1) is preferably a MM-77 series microcomputer. All of the foregoing microcomputer products are manufactured by Rockwell International Corporation of Anaheim, Calif.

Instruction sets for programming these devices are disclosed in Product Description, MM-76 Series, March 1977, Revision: 3, 29410N41, and Product Description, MM-77 and MM-78, March 1977, Revision: 3, 29410N42, both available from Rockwell International Corp.

An exemplary program listing for generating rate chart addresses and postage computation is disclosed in the copending related application of Dlugos. In addition, the program listing for special fee computation is appended hereto in Appendix I. Reference should be made to the Product descriptions listed above for explanations of the listing entries. Given the rate chart formats described herein, the actual rate charts can be constructed using data published by the U.S. Postal Service and the United Parcel Service.

While there has been described what is considered to be a preferred embodiment of the invention, variations and modifications therein will occur to those skilled in the art when they become acquainted with the basic concepts of the invention. Therefore, it is intended that the appended claims shall be construed to include the preferred embodiment and all such variations and modifications as fall with the true spirit and scope of the invention.

What is claimed is:

1. A method for calculating a postage value for an article to be mailed, said method comprising the steps of:
    (a) selecting postal information indicative of the carrier type, class and destination of an article to be mailed;
    (b) obtaining weight information for said article;
    (c) selecting special fee information indicative of at least one of a plurality of special fee categories for use with said article;
    (d) determining whether two or more of said plurality of special fee categories are mutually exclusive in accordance with a predetermined schedule of charges; and
    (e) generating a postage value for said article from said postal information, said weight information and said special fee information.

2. The method for calculating a postage value for an article to be mailed as defined in claim 1 wherein the step of determining whether two or more of said plurality of special fee categories are mutually exclusive in accordance with a predetermined schedule of charges further comprises subtracting a first value indicative of one of said plurality of special fee categories and substituting a second value indicative of a second of said plurality of special fee categories therefor when said first value and said second value are mutually exclusive.

3. The method for calculating a postage value for an article to be mailed as defined in claim 1 wherein the step of determining whether two or more of said plurality of special fee categories are mutually exclusive in accordance with a predetermined schedule of charges further comprises adding a first value indicative of one of said plurality of special fee categories and adding a second value indicative of a second of said plurality of special fee categories when said first value and said second value are mutually exclusive.

4. The method for calculating a postage value for an article to be mailed as defined in claim 1 wherein the step of generating a postage value includes using data in a look-up table for part of said calculation.

5. The method for calculating a postage value for an article to be mailed as defined in claim 4 wherein the step of generating a postage value further comprises processing the information in a predetermined manner to generate a postage value.

6. Apparatus for calculating a postage value for an article to be mailed, comprising:
    (a) means for providing postal information indicative of the carrier type, class and destination of an article to be mailed;
    (b) means for providing weight information for said article;
    (c) means for selecting special fee information indicative of at least one of a plurality of special fee categories for use with said article;
    (d) means for determining whether two or more of said plurality of special fee categories are mutually exclusive in accordance with a predetermined schedule of charges; and
    (e) means for generating a postage value for said article from said postal information, said weight information and said special fee information.

7. The apparatus in accordance with claim 6 wherein the means for selecting special fee information further comprises means for subtracting a first value indicative of one of said plurality of special fee categories and substituting a second value indicative of a second of said plurality of special fee categories therefor when said first value and said second value are mutually exclusive in accordance with a predetermined schedule of charges.

8. The apparatus for calculating the postage value for an article to be mailed as defined in claim 6 wherein the means for generating a postage value includes a look-up table for part of said calculation.

9. The apparatus for calculating a postabe value for an article to be mailed as defined in claim 6 wherein the means for determining whether two or more of said plurality of special fee categories are mutually exclusive in accordance with a predetermined schedule of charges further comprises means for adding a first value indicative of one of said plurality of special fee categories and means for adding a second value indicative of a second of said plurality of special fee categories when said first value and said second value are not mutually exclusive.

10. Apparatus for calculating a postage value for an article of predetermined weight including a special fee to be mailed according to a predetermined postal class, comprising:
    (a) means for calculating a postage value of an article of predetermined weight according to a first predetermined schedule of charges based on the weight of said article and the destination thereof;

(b) means for calculating one of a plurality of special fee values of said article according to a second predetermined schedule of charges;

(c) means for determining whether said calculated special fee value is mutually exclusive with another of said plurality of special fee values, thereby making said calculated special fee value unsuitable for use with a predetermined postal class; and (d) means for totaling said special fee value and said postage value if said special fee category associated with said special fee value is suitable for use with said predetermined postal class.

11. Apparatus for calculating a postage value for an article to be mailed, comprising:

(a) a weighing scale for determining the weight of an article to be mailed;

(b) a data entry station for entering the postal class, the destination and one of a plurality of special fee categories of said article and for providing a signal indicative of said postal class, destination and special fee category;

(c) a scale subsystem processor operatively connected to said weighing scale and adapted to receive a signal therefrom indicative of the weight of said article; and (d) a system processor operatively connected to said scale subsystem processor for receiving a signal therefrom indicative of the weight of said article, said system processor also operatively connected to said data entry station for receiving said signal therefrom indicative of said postal class, destination and special fee category, said system processor including:

(i) means for determining whether the special fee category entered from said data entry station and another of said plurality of special fee categories are mutually exclusive, thereby making said entered special fee category unsuitable for use with said postal class entered from said data entry station, and (ii) means for calculating the total postage value required to mail said article if said special fee category is suitable for use with said postal class.

12. Apparatus in accordance with claim 11 wherein said data entry station includes a keyboard and display.

13. Apparatus in accordance with claim 12 further comprising:

(e) a postage printing subsystem processor operatively connected to said system processor for receiving a signal therefrom indicative of said total postage value required to mail said article and for providing a signal to enable a postage printer to print said total postage value; and (f) a postage printer operatively connected to said postage printing subsystem processor for receiving said signal therefrom and in response thereto printing said total postage value.

14. Apparatus in accordance with claim 13 further comprising:

(g) a peripheral subsystem processor operatively connected to said system processor for receiving a signal therefrom and for providing a signal to enable a peripheral device to accept a signal indicative of said postal class, said destination, said special fee category and said total postage fee.

15. Apparatus in accordance with claim 14 further comprising:

(h) a parallel data bus operatively connected to said peripheral subsystem processor; and (i) a plurality of peripheral devices operatively connected to said parallel data bus, each of said peripheral devices being adapted to receive a signal indicative of said postal class, said destination, said peripheral fee category and said total postage fee.

* * * * *

UNITED STATES PATENT AND TRADEMARK OFFICE
CERTIFICATE OF CORRECTION

PATENT NO. : 4,325,440                         Page 1 of 3

DATED : April 20, 1982

INVENTOR(S) : Raymond R. Crowley, Edward P. Daniels and Earl B. Holtz

It is certified that error appears in the above-identified patent and that said Letters Patent are hereby corrected as shown below:

Column 16, line 45 through column 17, line 25 should read as shown below:

SPECIAL FEE CALCULATING PROGRAM OUTLINE

```
Perform Decode Fee
Perform Read and Store Main Header
If Subtract Fee
   Set Subtract Flag
   Continue
Else Continue
Perform Read and Store Keycode Restriction
If Fee is Not Valid With Postal Class
   End Module
Else If Special Fee Restriction Present
     Perform Read and Store Restriction
     If Fee Does Not Pass Restriction
       Set Soft Error Flag
     Else Set Restrictions Met Flag
       Continue
     Else If Weight Restriction
          Perform Read and Store Weight Restriction
          If Fee Does Not Pass Weight Restriction
            Set Soft Error
          Else:  Continue
        Else:  If Insurance Restriction
             Perform Read and Store Restriction
               If Fee Does Not Pass Insurance Restriction
                 If Other Restrictions Were Met
                   Reset Soft Error
                   Go to 100
                 Else:  Set Soft Error
```

UNITED STATES PATENT AND TRADEMARK OFFICE
CERTIFICATE OF CORRECTION

PATENT NO. : 4,325,440  
DATED : April 20, 1982  
INVENTOR(S) : Raymond R. Crowley, Edward P. Daniels and Earl B. Holtz Page 2 of 3

It is certified that error appears in the above-identified patent and that said Letters Patent are hereby corrected as shown below:

```
100:   Else:   Else:  If Soft Error
                        If Last Restriction
                          Perform Clean Up
                          End Module
                        Else:  Perform Check in Restriction Set
                      Else:  Perform Read Keyscreen
                        If Fee Incompatible With Existing Fees
                          Reset All Bad Fees
                          Set Redo Flag
                          Continue
                        Else Perform Read Chart Header
                          If Value Needed
                            If No Value Entered
                              Ask for Dollar Value
                              End Module
                            Else:  Else Do While Headers Available
                              If Correct Range
                                If Add Fee
                                  Add Fee to Dollar Total
                                  End Module
                                Else If Subtract Fee
                                    Subtract Fee From Dollar Total
                                    Else:  Replace Total With Fee
                              Else:  Point at Next Range
                                Continue Do While
               End Do While:  If Value Fee
                                Ask for Dollar Value
                                End Module
                              Else End Module
```

UNITED STATES PATENT AND TRADEMARK OFFICE
CERTIFICATE OF CORRECTION

PATENT NO. : 4,325,440

DATED : April 20, 1982

INVENTOR(S) : Raymond R. Crowley, Edward P. Daniels and Earl B. Holtz

It is certified that error appears in the above-identified patent and that said Letters Patent are hereby corrected as shown below:

Claim 3, last line:

"Value are mutually exclusive" should read -- value are not mutually exclusive --.

Column 24, line 37:

"periphial" should read -- special --.

Signed and Sealed this

Eighteenth Day of January 1983

[SEAL]

Attest:

Attesting Officer

GERALD J. MOSSINGHOFF

Commissioner of Patents and Trademarks